Figure 1:
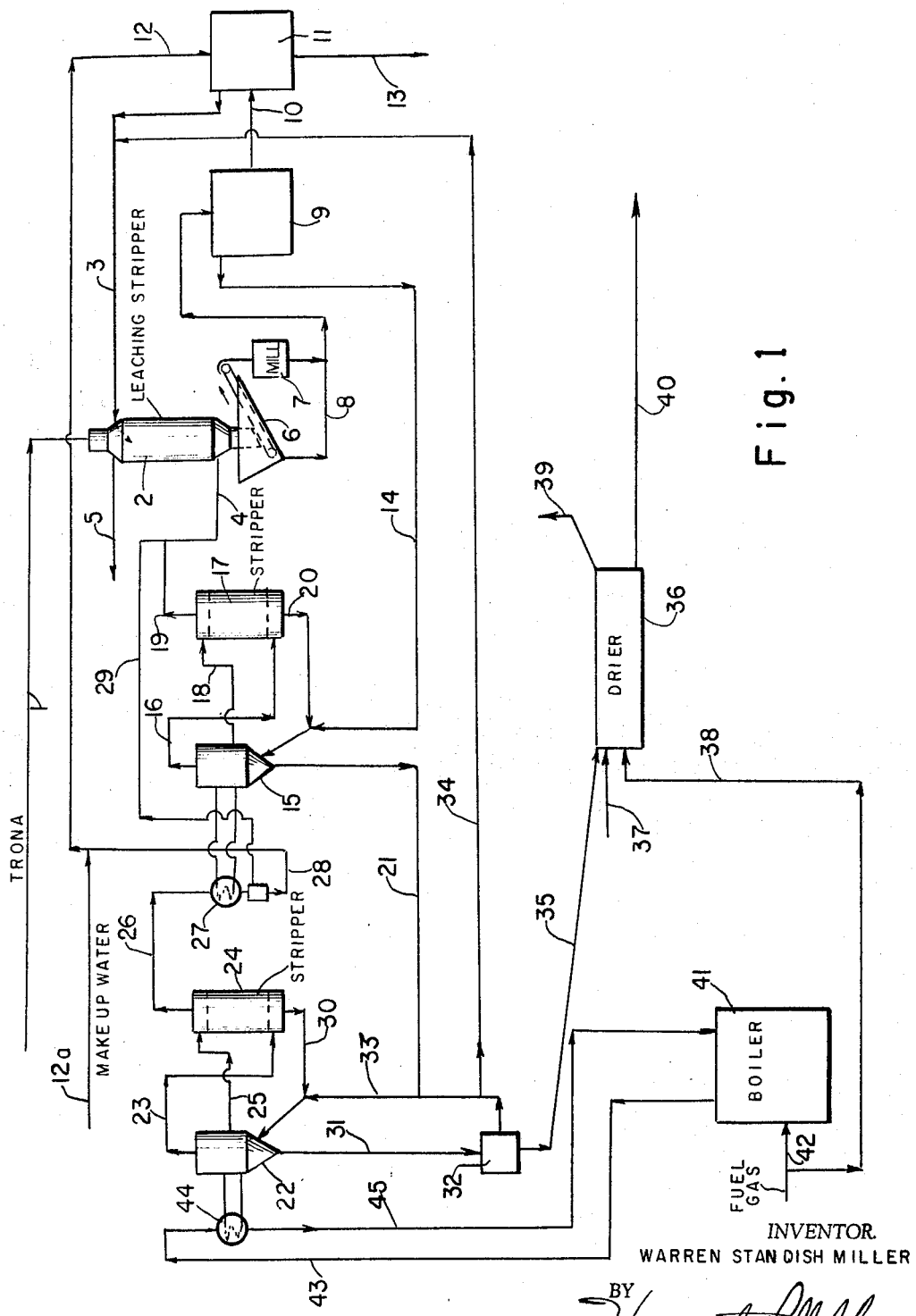

INVENTOR.
WARREN STANDISH MILLER

ATTORNEYS

INVENTOR.
WARREN STANDISH MILLER

INVENTOR.
WARREN STANDISH MILLER

BY

ATTORNEYS

United States Patent Office 3,264,057
Patented August 2, 1966

3,264,057
PREPARATION OF SODA ASH INCLUDING THE LEACHING OF TRONA WITH STEAM
Warren Standish Miller, Fullerton, Calif., assignor, by mesne assignments, to Intermountain Research & Development Corporation, Cheyenne, Wyo., a corporation of Wyoming
Filed Mar. 7, 1963, Ser. No. 263,524
6 Claims. (Cl. 23—63)

The invention relates to a novel process for the preparation of soda ash crystals of high density by leaching the carbonate values from crude trona and decomposing the major part of the sodium bicarbonate in the resulting solution by steam stripping.

Crude trona, is found in underground deposits in Sweetwater County, Wyoming, and other areas around the world. The trona deposits in Sweetwater County are found at depths ranging from 1100 feet to 1800 feet underground and consists of a main trona bed varying from 8 to 18 feet in thickness and other beds of varying smaller thicknesses. The principal component of trona is sodium sesquicarbonate ($Na_2CO_3 \cdot NaHCO_3 \cdot 2H_2O$) with varying amounts of organic and inorganic impurities. The crude trona when mined usually contains about 90% sodium sesquicarbonate and about 10% shale.

Prior art processes for the production of soda ash from crude trona have comprised grinding the crude trona, calcining the crude trona to crude soda ash, dissolving the crude soda ash in aqueous solution, removing insoluble materials, crystallizing sodium carbonate values from the aqueous solution and recovering soda ash. The calcination of the crude trona makes the removal of impurities more difficult. When the trona is calcined at low temperatures, organic impurities become more soluble and interfere with the crystallization step. If the trona is calcined at a temperature high enough to destroy the organic impurities, silica impurities tend to become more soluble and silica removal becomes more difficult.

Other prior art processes for the preparation of soda ash from crude trona have comprised grinding the crude trona, dissolving the ground trona in a hot aqueous solution, usually recycled mother liquor, removing insoluble impurities from the resulting aqueous solution, crystallizing sodium sesquicarbonate from the said solution, calcining the sodium sesquicarbonate crystals to soda ash and recycling the mother liquor. The soda ash produced by this process has a bulk density of 48 to 50 pounds per cubic foot. The gross heat requirements for this process are substantial, because the sodium sesquicarbonate solution is dilute due to the low solubility of sodium bicarbonate, and adds materially to the cost of the soda ash.

It is an object of the invention to provide a process for the production of soda ash which avoids solubilizing impurities by an initial calcination.

It is another object of the invention to provide a process for the production of soda ash which avoids the expense of grinding the crude trona before dissolving.

It is an additional object of the invention to provide a process with lower gross heat requirements for the production of soda ash having a bulk density of 70 to 80 pounds per cubic foot.

It is another object of the invention to provide a process for the production of soda ash from solutions of high sodium carbonate concentration.

These and other objects and advantages of the invention will become obvious from the following detailed description.

The process of the invention for the production of soda ash from crude trona comprises leaching the carbonate values from the crude trona with an aqueous solvent, decomposing the major fraction of the sodium bicarbonate in solution to sodium carbonate by steam stripping whereby an aqueous solution of high sodium carbonate content is obtained, crystallizing anhydrous sodium carbonate from the said solution of sodium carbonate, drying the crystals to soda ash and recovering soda ash of a high bulk density.

The leaching and the steam stripping steps can be carried out separately or simultaneously. When carried out separately, the leaching of the crude trona may be carried out underground by pumping the hot solvent into a well, removing a solution of sodium sesquicarbonate and then subjecting the said solution to steam stripping above ground. The leaching and stripping is preferably effected simultaneously by allowing the solvent to trickle through a column of crude trona lumps whereby the solvent wets the surface of the crude trona and dissolves the sodium sesquicarbonate to form a solution of sodium carbonate and sodium bicarbonate and by passing steam through the column whereby the sodium bicarbonate is decomposed to sodium carbonate which remains in solution and carbon dioxide which is removed with the steam from the column.

The process of the invention gives a more concentrated solution of sodium carbonate than is possible when dissolving and crystallizing sodium sesquicarbonate and, therefore, the amount of water which has to be evaporated is reduced and the gross heat requirements for the process are reduced. By leaching the crude trona as mined, the grinding of the trona is avoided and only the lumps of shale remaining after leaching need be ground before transmitting the shale to a disposal area by hydraulic means. The avoidance of a preliminary calcining step prevents any difficulties due to solubilizing of impurities by preliminary calcining.

Figure 2:
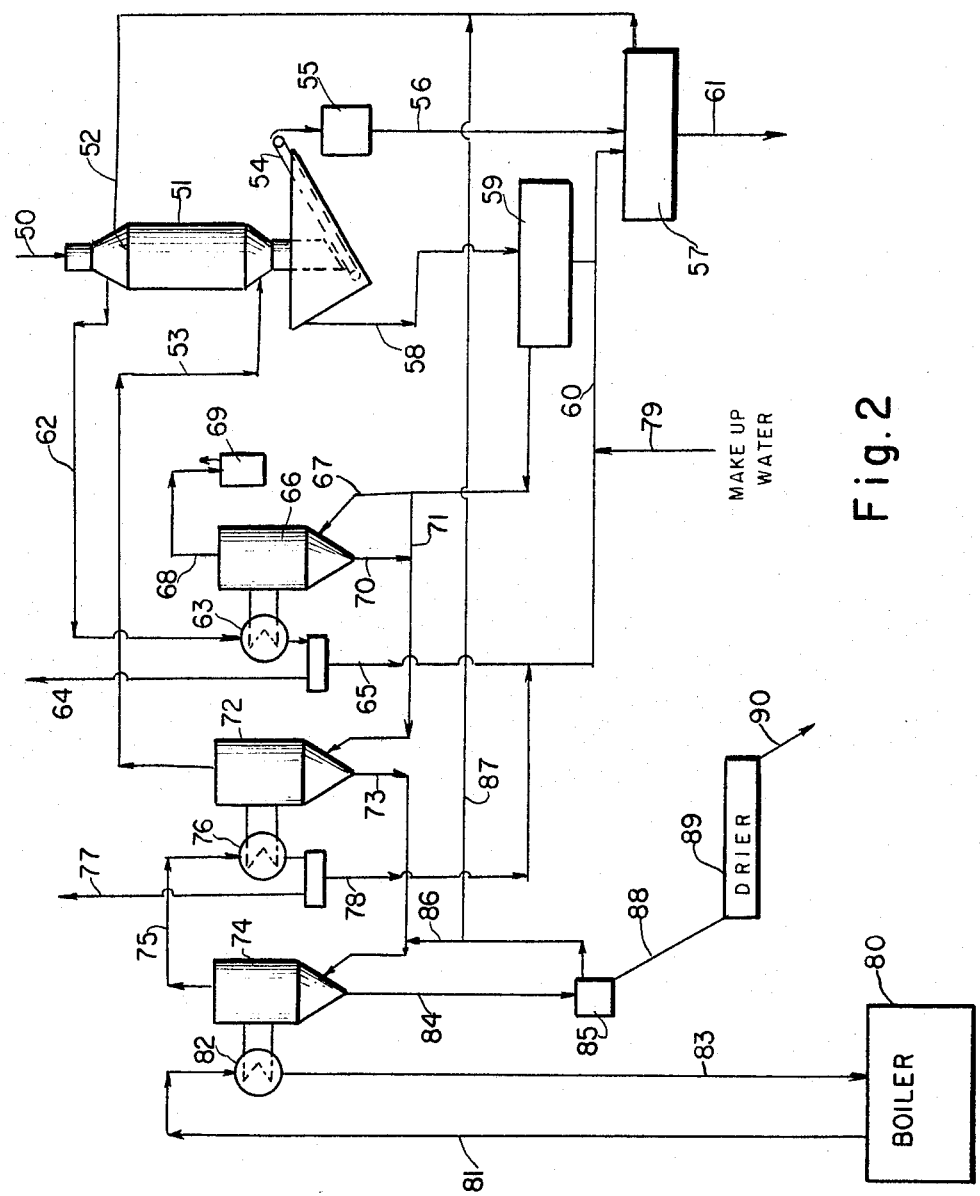
Figure 3:
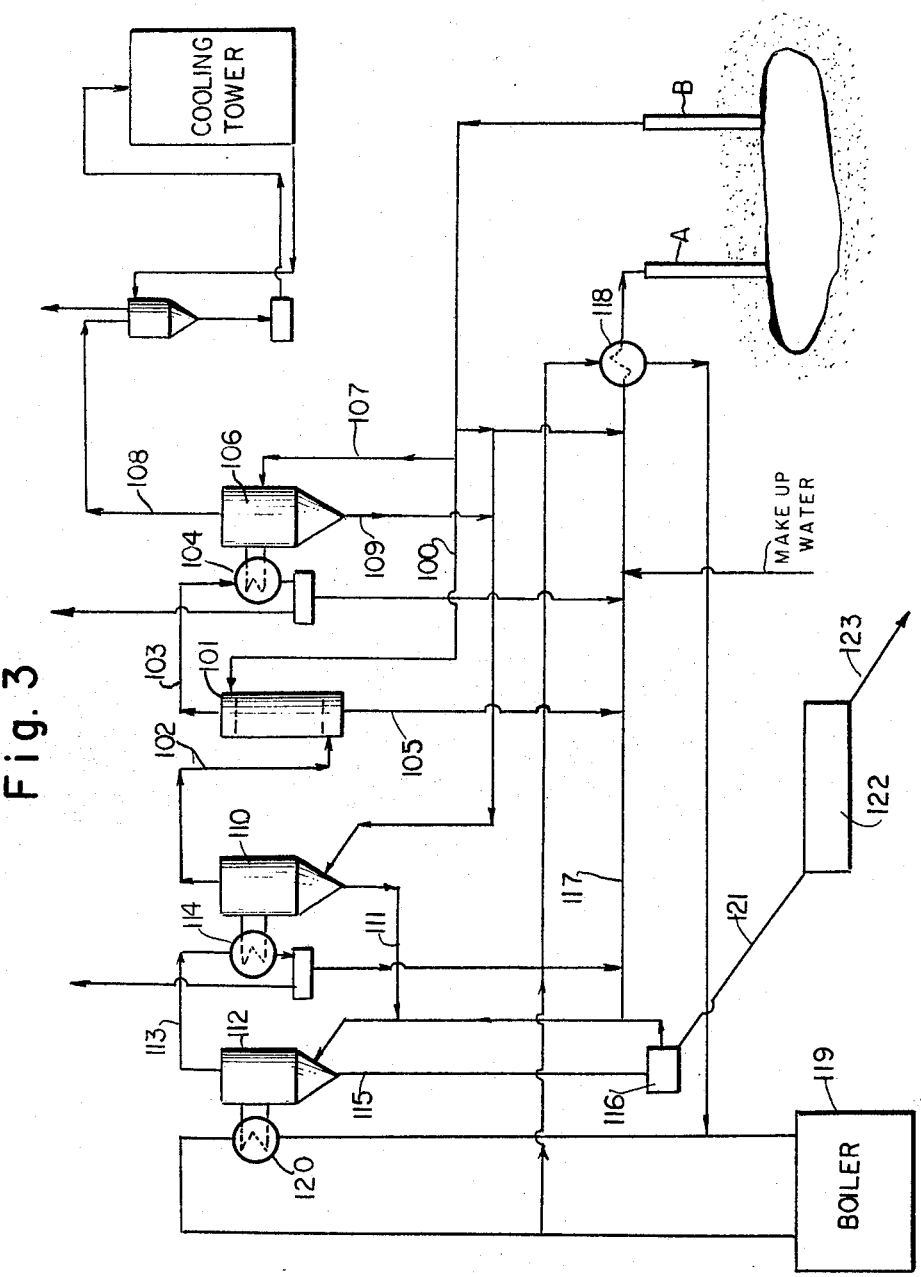

Referring now to the drawings:
FIG. 1 illustrates diagrammatically a simultaneous leaching and stripping process with two-stage evaporation and stripping to produce soda ash;
FIG. 2 illustrates diagrammatically a simultaneous leaching and stripping process with three-stage evaporation to produce soda ash; and
FIG. 3 illustrates diagrammatically a separate leaching and stripping process with three-stage evaporation to produce soda ash.

In FIG. 1 mined lumps of crude trona are introduced by conveyor 1 to the top of a leaching-stripper column 2. Heated solvent is added by line 3 to the top of column 2, at a rate adequate to wet the trona lumps without filling the column 2 with solvent. Steam is introduced by line 4 at the bottom of column 2 which, while passing through the column, decomposes the sodium bicarbonate in the solvent to sodium carbonate and carbon dioxide. The carbon dioxide and the steam are taken from the top of column 2 by line 5 and are vented to the atmosphere.

The leached solids are removed from column 2 by conveyor 6 and ground in mill 7 to a smaller size and mixed with the sodium carbonate solution removed from column 2 by line 8. The mixture of ground solids and sodium carbonate solution are passed to clarifier 9 wherein the solids are settled out and the solids are removed by line 10 to washer 11 wherein they are washed with water from line 12. The washed solids are sent by line 13 to waste disposal and the wash water is removed from washer 11 by line 3 to be used as part of the solvent for the leaching of the crude trona.

The clear sodium carbonate solution containing small amounts of sodium bicarbonate is removed from clarifier 9 by line 14 and passed to evaporator 15 operated at about 107° C. The steam from low stage evaporator 15 is removed by line 16 and is added to the base of steam stripper 17 to further decompose sodium bicarbonate in the sodium carbonate solution from evaporator 15 which was added to the top of stripper 17 by line 18 before passing the steam and carbon dioxide to column 2 by lines 19 and 4. The sodium carbonate solution is removed from stripper 17 by line 20 and is mixed with the sodium carbonate solution in line 14.

The anhydrous sodium carbonate crystal slurry from low stage evaporator 15 is passed by line 21 to high stage evaporator 22 operated at about 127° C. The steam from evaporator 22 is passed by line 23 to the base of steam stripper 24 to decompose sodium bicarbonate in the sodium carbonate solution from evaporator 22 which was added to the top of stripper 24 by line 25. The steam and carbon dioxide are removed from the top of stripper 24 by line 26 and are passed to condenser 27 wherein most of the steam is condensed and the heat recovered is used for evaporator 15. The water from condenser 27 is added by line 28 to the wash water in line 12 and make-up water from the line 12a, together with the wash water from line 12, is used in the washer 11 and the residual steam and carbon dioxide are added by line 29 to the steam in line 4 used in column 2. The sodium carbonate solution from stripper 24 is removed by line 30 and added to the anhydrous sodium carbonate crystal slurry in line 21.

The anhydrous sodium carbonate crystal slurry from high stage evaporator 22 is passed by line 31 to centrifuge 32 wherein the mother liquor is removed from the crystals. A portion of the mother liquor is recycled by line 33 to high stage evaporator 22 and the remainder of the mother liquor is recycled by line 34 to the solvent in line 3 and used in column 2. The mother liquor is recycled to column 2 because residual sodium bicarbonate therein is decomposed in column 2 and an excessive build-up of sodium bicarbonate in the solutions is avoided.

The anhydrous sodium carbonate crystals are passed by line 35 from the centrifuge 32 to drier 36 wherein the crystals are dried with air and hot gas added to drier 36 by lines 37 and 38, respectively. As the evaporator 22 operates at about 127° C. the crystals produced are anhydrous sodium carbonate. The anhydrous sodium carbonate crystals are dried and any residual sodium bicarbonate crystals are decomposed to sodium carbonate and carbon dioxide. The gases are removed from the drier 36 by line 39 and the soda ash is removed by conveyor 40.

The heat for high stage evaporator 22 may be supplied by any external means. In FIG. 1 water in boiler 41 is heated by gas from line 42 and steam is passed by line 43 to heat exchanger 44. The steam at 147.5° C. is condensed to water at 133° C. and returned to the boiler 41 by line 45, and the solution circulating from evaporator 22 is heated to about 127° C. and returned to the evaporator 22.

In the process illustrated in FIG. 2 crude mined trona is added by conveyor 50 to the top of column 51 and heated solvent is added by line 52 to the top of column 51. Steam is introduced at the base of column 51 by line 53 which heats the trona lumps and the solvent and decomposes sodium bicarbonate, dissolved from the trona lumps by the solvent, to sodium carbonate and carbon dioxide while passing through the column 51.

The insoluble solid material removed from the base of column 51 is passed by conveyor 54 to mill 55 where it is ground to a smaller size and then passed by conveyor 56 to washer 57. The sodium carbonate solution from the base of column 51 is passed by line 58 to clarifier 59 wherein the suspended solids settle to the bottom of the clarifier. The solids are passed from clarifier 59 to washer 57 along with wash water from line 60. The washed solids are then disposed of by conveyor 61 and the used wash water is used as the solvent in column 51.

The steam and carbon dioxide are removed from the top of column 51 by line 62 and are passed through a heat exchange condenser 63 wherein the majority of the steam is condensed to water. The uncondensed steam and carbon dioxide are then vented to the atmosphere by line 64 and the condensed water is added by line 65 to the wash water of line 60. The heat recovered in condenser 63 is used to supply heat to low stage evaporator 66 which has about three-fourths of the sodium carbonate solution from clarifier 59 passed thereto by line 67. The water vapor from evaporator 66 operated at about 60° C. is passed by line 68 to condenser 69. The slurry of sodium sesquicarbonate crystals and mother liquor is removed from evaporator 66 by line 70 and joined with the remaining one-fourth of the sodium carbonate solution in line 71 from clarifier 59.

The sodium carbonate slurry in line 71 is passed to middle stage evaporator 72 operated at about 107° C. The water vapor from evaporator 72 is passed by line 53 to the base of column 51. The slurry of anhydrous sodium carbonate and sodium sesquicarbonate crystals is passed from middle stage evaporator 72 by line 73 to high stage evaporator 74 operated at about 145° C. Steam and carbon dioxide from evaporator 74 are passed by line 75 to condenser 76 wherein most of the steam is condensed and the uncondensed steam and carbon dioxide are vented to the atmosphere by line 77. The condensate from condenser 76 is passed by line 78 along with condensate from line 65 and make-up water 79 to line 60 and then to washer 57.

The heat recovered in condenser 76 is the source of heat for evaporator 72. Heat is supplied to evaporator 74 by a boiler 80 and steam in line 81 is condensed in condenser 82 and the condensed water is returned by line 83 to boiler 80.

The slurry of anhydrous sodium carbonate and mother liquor is removed from evaporator 74 by line 84 and passed to centrifuge 85 to separate the mother liquor from the crystals. Part of the mother liquor is returned to evaporator 74 by line 86 and the remainder of the mother liquor is recycled by line 87 to column 51. The anhydrous sodium carbonate crystals are passed by conveyor 88 to drier 89 and the dried soda ash crystals are removed from drier 89 by conveyor 90.

FIG. 3 illustrates the process of the invention using underground leaching and above ground steam stripping. The solution coming from well B contains dissolved sodium sesquicarbonate and is saturated at 90° C. A portion of the solution is passed by line 100 to the top of steam stripper 101 operated at about 110° C. and steam is introduced at the bottom of stripper 101 by line 102. The steam and carbon dioxide are removed from the top of stripper 101 by line 103 and is passed through a heat exchange condenser 104, the recovered heat being used as a source of heat for low stage evaporator 106. The sodium carbonate solution is removed from the base of stripper 101 by line 105 and is passed to well A where it flows from well A to well B to dissolve more trona. A part of the solution from well B is the feed to the evaporator system and is passed by line 107 to evaporator 106. The water vapor from evaporator 106 is removed by line 108 and is condensed by any suitable means, i.e., by water from a cooling tower. The sodium carbonate solution including crystals is passed from the base of evaporator 106 by line 109 to middle stage evaporator 110 operated at about 110° C. where additional water is removed as steam by line 102 which delivers the steam to stripper 101.

The crystal slurry of anhydrous sodium carbonate and sodium sesquicarbonate is passed by line 111 from middle stage evaporator 110 to high stage evaporator 112 operated at about 145° C. The water and carbon dioxide vapors are removed from evaporator 112 by line 113 and are passed through heat exchanger 114, the recovered heat being used as a source of heat for middle stage evaporator 110.

The anhydrous sodium carbonate crystal slurry from evaporator 112 is passed by line 115 to centrifuge 116 to separate the said crystals from the mother liquor. A portion of the mother liquor is recycled by line 117 to well A to transfer impurities to the well cavity. Make-up water and the water condensed from the steam in lines 113 and 103 are added to the mother liquor and, together with the sodium carbonate solution from line 105 and recycled from well B, if necessary, are heated in heat exchanger 118 and then are delivered to well A to dissolve more trona. Heat exchanger 118 is heated by steam from boiler 119. Steam from boiler 119 also flows to heat exchanger 120 to supply heat to evaporator 112. The anhydrous sodium carbonate crystals are passed from centrifuge 116 by line 121 to drier 122 and the soda ash crystals are removed from drier 122 by conveyor 123.

EXAMPLE I

For a plant producing 274 tons per day of soda ash from crude trona containing about 10% shale impurities according to the embodiment of the invention as illustrated and described in connection with FIG. 1, the material balances are as follows. The data is in tons unless otherwise indicated.

Table I

| Composition in Plant | Material Balance to Produce 274 Tons of Soda Ash | | | | | |
|---|---|---|---|---|---|---|
| | $NaHCO_3$ | $Na_2CO_3$ | $CO_2$ | Water | Shale | Total |
| Trona feed to column 2 | 153.5 | 194.5 | | 65.9 | 45.9 | 459.8 |
| Vapor from column 2 | | | 39.2 | 229.7 | | 268.9 |
| Discard from washer 11 | 1.9 | 15.4 | | 90.8 | 45.9 | 154.0 |
| Feed to low stage evaporator 15 | 73.5 | 258.1 | | 718.4 | | 1,050.0 |
| Vapor from low stage stripper 17 | | | 7.4 | 295.0 | | 302.4 |
| Slurry from low stage evaporator 15 | 45.3 in m.l. | 175.4 in m.l., 100.4 cry. | | 426.4 | | 747.5 |
| Vapor from high stage stripper 24 | | | 9.5 | 345.0 | | 354.5 |
| Slurry from high stage evaporator 22 | 8.9 in m.l. | 32.8 in m.l., 266.0 cry. | | 85.3 | | 393.0 |
| Mother liquor recycle to column 2 | 7.0 | 25.8 | | 67.2 | | 100.0 |
| Drier feed | 1.9 in m.l. | 7.0 in m.l., 266.0 cry. | | 18.1 | | 293.0 |
| Drier product | | 274.0 | 0.5 | 18.3 | | 292.8 | m.l. is mother liquor.

EXAMPLE II

For a plant producing 274 tons per day of soda ash from crude trona containing about 10% shale impurities according to the embodiment of the invention as illustrated and described in connection with FIG. 2, the material balances summarized in Table II will be maintained in the plant. The data is in tons unless otherwise indicated. The process of FIG. 2 is more economical than FIG. 1 since the heat content of the steam from the leaching column is used in the low stage evaporation rather than being vented to the atmosphere as in FIG.

Table II

| Composition in Plant | Material Balance to Produce 274 Tons per day of Soda Ash | | | | | |
|---|---|---|---|---|---|---|
| | $NaHCO_3$ | $Na_2CO_3$ | $CO_2$ | Water | Shale | Total |
| Trona feed to column 51 | 153.5 | 194.0 | | 65.9 | 45.9 | 459.3 |
| Vapor from column 51 | | | 24.4 | 122.1 | | 146.5 |
| Discard from washer 57 | 1.9 | 15.4 | | 90.8 | 45.9 | 154.0 |
| Solution from clarifier 59 | 73.6 | 258.5 | | 719.9 | | 1,052.0 |
| Feed to low stage evaporator 66 | 56.7 | 199.0 | | 554.3 | | 810. |
| Product from low stage evaporator 66 | 11.7 in m.l., 43.1 cry. | 145.8 in m.l., 54.4 cry. | | 374 in m.l., 18.5 cry. | | 531.5 in m.l., 116 cry. |
| Feed to middle stage evaporator 72 | 71.7 | 259.7 | | 558.1 | | 889.5. |
| Vapor from middle stage evaporator 72 | | | 0.63 | 209.5 | | 210.13. |
| Feed to high stage evaporator 74 | 31.7 in m.l., 48.9 cry. | 138.8 in m.l., 111.1 cry. | | 332.7 in m.l., 16.1 cry. | | 503.2 in m.l., 176.1 cry. |
| Vapor from high stage evaporator 74 | | | 13.86 | 273.0 | | 286.86. |
| Slurry to centrifuge 89 | 16.5 in m.l. | 228.6 in m.l., 266.0 cry. | | 81.5 | | 126.6 in m.l., 266.0 cry. |
| Mother liquor to column 51 | 13.0 | 22.6 | | 64.4 | | 100.0. |
| Drier feed | 3.5 in m.l. | 6.0 in m.l., 266.0 cry. | | 17.1 | | 26.6 in m.l., 266.0 cry. |
| Drier product | | 274.0 | | | | 274.0. |

EXAMPLE III

For a plant producing 274 tons per day of soda ash by solution mining of crude trona according to the embodiment of the invention as illustrated and described in connection with FIG. 3, the material balances to be maintained in the plant are summarized in Table III. The data is in tons unless otherwise indicated.

*Table III*

| Composition in Plant | Material Balance to Produce 274 Tons per Day of Soda Ash | | | | |
|---|---|---|---|---|---|
| | NaHCO$_3$ | Na$_2$CO$_3$ | CO$_2$ | Water | Total |
| Well liquor feed to column 101 | 653 | 1,714 | | 5,793 | 8,160. |
| Vapor from column 101 | | | 22 | 200 | 220. |
| Feed to low stage evaporator 106 | 81.7 | 214 | | 725 | 1,021. |
| Vapor from low stage evaporator 106 | | | 0.9 | 286 | 286.9. |
| Product from low stage evaporator 106 | 17.5 in m.l., 60.8 cry. | 139.7 in m.l., 76.7 cry. | | 413.5 in m.l., 26 cry. | 571 in m.l., 163.4 cry. |
| Feed to middle stage evaporator 110 | 29.5 in m.l., 60.8 cry. | 171.5 in m.l., 76.7 cry. | | 520.6 in m.l., 26 cry. | 721.6 in m.l., 163.4 cry. |
| Vapor from middle stage evaporator 110 | | | 0.6 | 207 | 207.6. |
| Feed to high stage evaporator 112 | 33.1 in m.l., 54.8 cry. | 130.6 in m.l., 119.1 cry. | | 316.5 in m.l., 23.4 cry. | 480.2 in m.l., 197.3 cry. |
| Vapor from high stage evaporator 112 | | | 18.7 | 266 | 284.7. |
| Mother liquor to well B 117 | 13.0 | 22.6 | | 64.4 | 100. |
| Drier feed 121 | 3.5 in m.l. | 6.0 in m.l., 266 cry. | | 17.1 in m.l. | 26.6 in m.l., 266 cry. |
| Drier product 123 | | 274 cry. | | 0 | 274 cry. |

Various modifications of the process of the invention may be made without departing from the spirit or scope thereof, and it is to be understood that the invention is to be limited only as defined in the appended claims.

What is claimed is:

1. A process for the preparation of soda ash from crude trona which comprises leaching the carbonate values from the crude trona with an aqueous solvent, decomposing the major fraction of the sodium bicarbonate in the resulting solution to sodium carbonate by steam stripping, crystallizing anhydrous sodium carbonate from the said solution, drying the anhydrous sodium carbonate crystals to form soda ash and recovering soda ash having a high bulk density.

2. A process for the preparation of soda ash from crude trona which comprises leaching the carbonate values from the crude trona with a heated recycling mother liquor, decomposing the major fraction of sodium bicarbonate in the resulting solution by steam stripping, crystallizing anhydrous sodium carbonate from the said solution, separating the anhydrous sodium carbonate crystals from the mother liquor, recycling the mother liquor to the leaching step, drying the said anhydrous crystals to form soda ash of high bulk density and recovering the soda ash.

3. A process for the preparation of soda ash from crude trona which comprises simultaneously leaching carbonate values from the crude trona with an aqueous solvent and steam stripping the resulting solution to decompose the major fraction of the sodium bicarbonate to sodium carbonate, crystallizing sodium carbonate from the solution to form a slurry of anhydrous sodium carbonate crystals in mother liquor, separating the anhydrous sodium carbonate crystals from the mother liquor, drying the said crystals to form soda ash having a high bulk density and recovering the soda ash.

4. A process for the preparation of soda ash from crude trona which comprises simultaneously leaching carbonate values from the crude trona with a recycling mother liquor and steam stripping the resulting solution to decompose the major fraction of the sodium bicarbonate from the trona to sodium carbonate, crystallizing sodium carbonate from the solution to form a slurry of anhydrous sodium carbonate crystals in mother liquor, separating the anhydrous sodium carbonate crystals from the mother liquor, heating and recycling the mother liquor to the leaching step, drying the anhydrous sodium carbonate crystals to form soda ash having a high bulk density and recovering the soda ash.

5. A process for the preparation of soda ash from crude trona which comprises simultaneously leaching carbonate values from the crude trona by flowing a solvent downwardly over lumps of mined trona in a leaching column while simultaneously passing steam upwardly through said column countercurrent to the flow of solvent and trona downwardly through said column to decompose the major fraction of the sodium bicarbonate from the trona to sodium carbonate, crystallizing sodium carbonate from the solution to form a slurry of anhydrous sodium carbonate crystals in mother liquor, separating the anhydrous sodium carbonate crystals from the mother liquor, heating and recycling the mother liquor to the leaching step, drying the anhydrous sodium carbonate crystals to form soda ash having a high bulk density and recovering the soda ash.

6. A process for the preparation of soda ash from crude mined trona which comprises simultaneously leaching carbonate values from the crude trona by flowing a solvent downwardly over lumps of mined trona in a leaching column and decomposing the major fraction of the sodium bicarbonate from the trona to sodium carbonate by passing steam upwardly through said column countercurrent to the downward flow of the solvent through said column, removing the leached trona and sodium carbonate solution from the bottom of the leaching column, separating the leached trona from the said solution, crystallizing anhydrous sodium carbonate from the said solution at temperatures above 115° C. to form a slurry of anhydrous sodium carbonate crystals in mother liquor, separating the said crystals from the mother liquor, recycling the mother liquor to the leaching step and drying the anhydrous sodium carbonate crystals to form soda ash of high bulk density.

References Cited by the Examiner

UNITED STATES PATENTS

| 2,133,455 | 10/1938 | Keene et al. | 23—63 |
| 3,028,215 | 4/1962 | Frint | 23—63 |
| 3,113,834 | 12/1963 | Beecher et al. | 23—63 |
| 3,119,655 | 1/1964 | Frint et al. | 23—63 |
| 3,189,408 | 6/1965 | Miller | 23—63 |

OSCAR R. VERTIZ, *Primary Examiner.*

MAURICE A. BRINDISI, *Examiner.*

G. L. OZAKI, *Assistant Examiner.*